United States Patent [19]
Gemelli

[11] Patent Number: 5,404,695
[45] Date of Patent: Apr. 11, 1995

[54] FORAGE MOWER

[75] Inventor: Villelmo Gemelli, Mantova, Italy

[73] Assignee: Costruzione Macchine Agricole Di Gemelli Bruno, Curtatone, Italy

[21] Appl. No.: 160,125

[22] Filed: Dec. 2, 1993

[30] Foreign Application Priority Data

Dec. 7, 1992 [IT] Italy .............. MN92A0033

[51] Int. Cl.⁶ .............................................. A01D 34/66
[52] U.S. Cl. ............................................ 56/6; 56/13.6; 56/15.8; 56/DIG. 10
[58] Field of Search .............. 56/1, 6, 13.5, 13.6, 56/15.6, 15.8, DIG. 1, DIG. 10

[56] References Cited

U.S. PATENT DOCUMENTS

| 3,070,938 | 1/1963 | Winget | 56/6 |
| 3,857,225 | 12/1974 | Knudson | 56/13.6 |
| 4,787,196 | 11/1988 | Voler et al. | 56/13.6 |
| 4,972,664 | 11/1990 | Frey | 56/13.6 |

FOREIGN PATENT DOCUMENTS

| 2131598 | 12/1972 | Germany . | |
| 3022742 | 1/1981 | Germany . | |
| 3022887 | 2/1982 | Germany . | |
| 4007735 | 9/1991 | Germany . | |
| 1335163 | 9/1987 | U.S.S.R. | 56/13.6 |

Primary Examiner—David J. Bagnell
Attorney, Agent, or Firm—Guido Modiano; Albert Josif; Daniel O'Byrne

[57] ABSTRACT

Forage mower, including at least one module which is connected to a supporting unit provided with a feeding motion by means of a pair of motorized rockers and including a main frame which is pivoted to the rockers and to which two end subframes of a chain of three mutually pivoted subframes are pivoted; each subframe supports a disk that has mowing blades and is rotated by a hydraulic motor supported by the subframe. The main frame is pivoted to the rockers about an axis perpendicular to the direction of feeding motion, while the end subframes are pivoted to the main frame about axes parallel to the direction of feeding motion and the end subframes are also pivoted to the intermediate subframe about axes parallel to the direction of feeding motion.

17 Claims, 2 Drawing Sheets

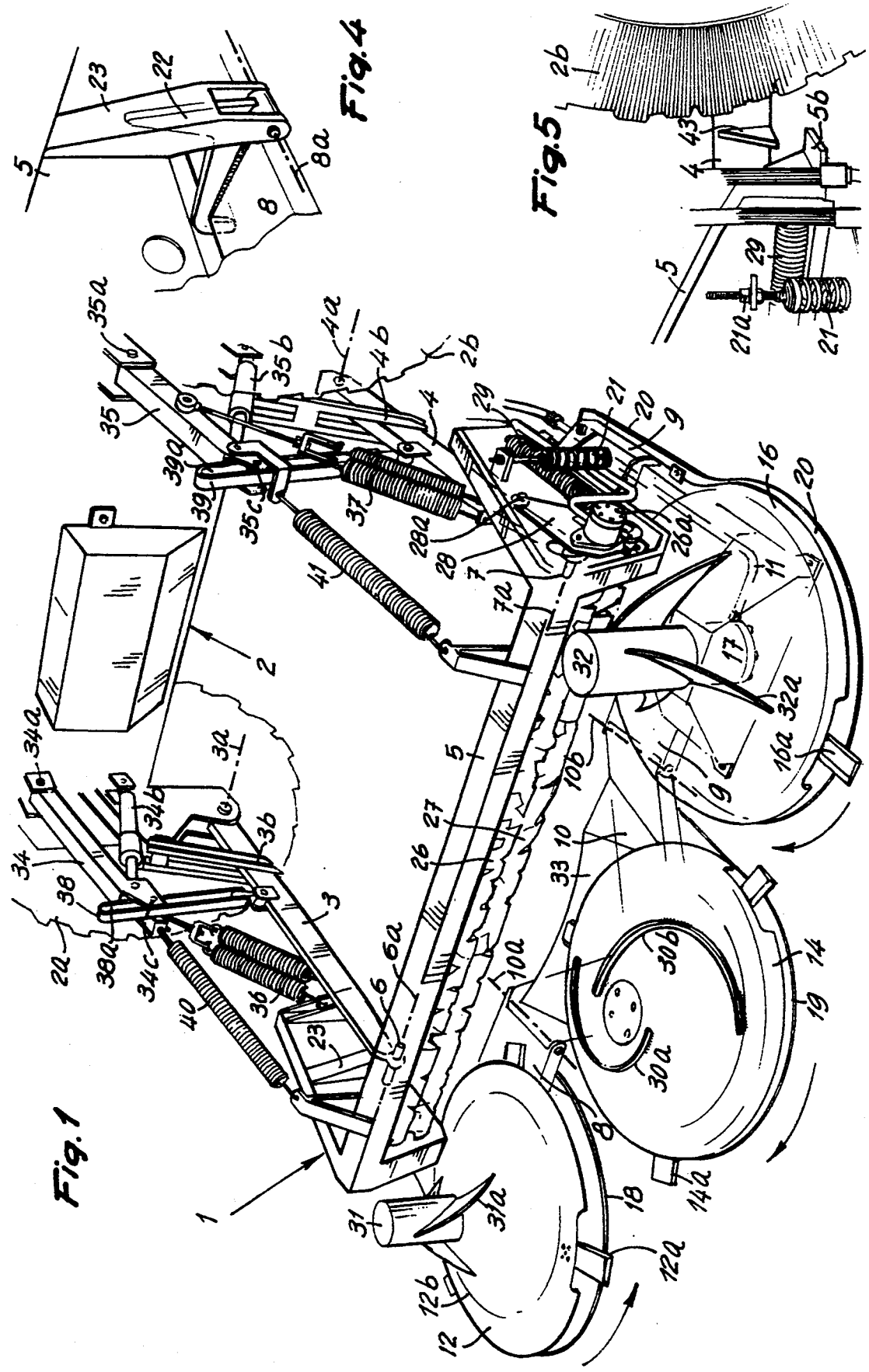

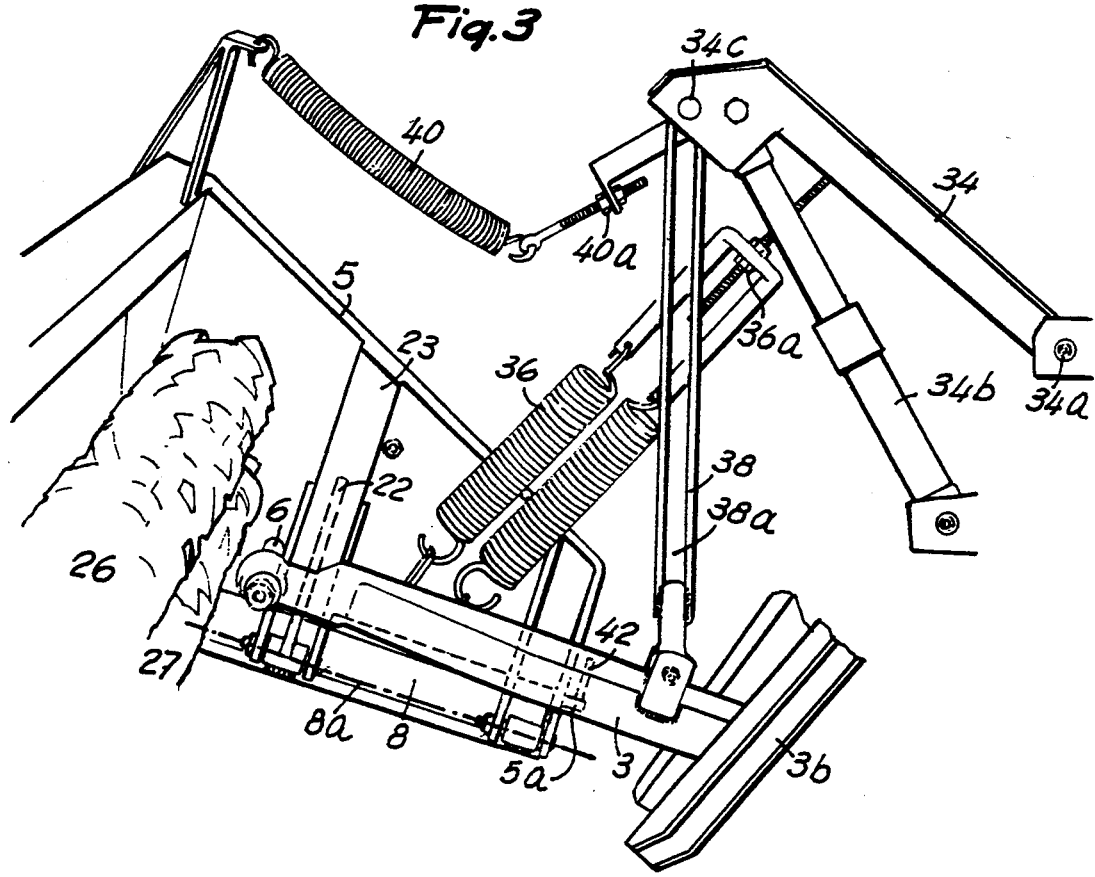
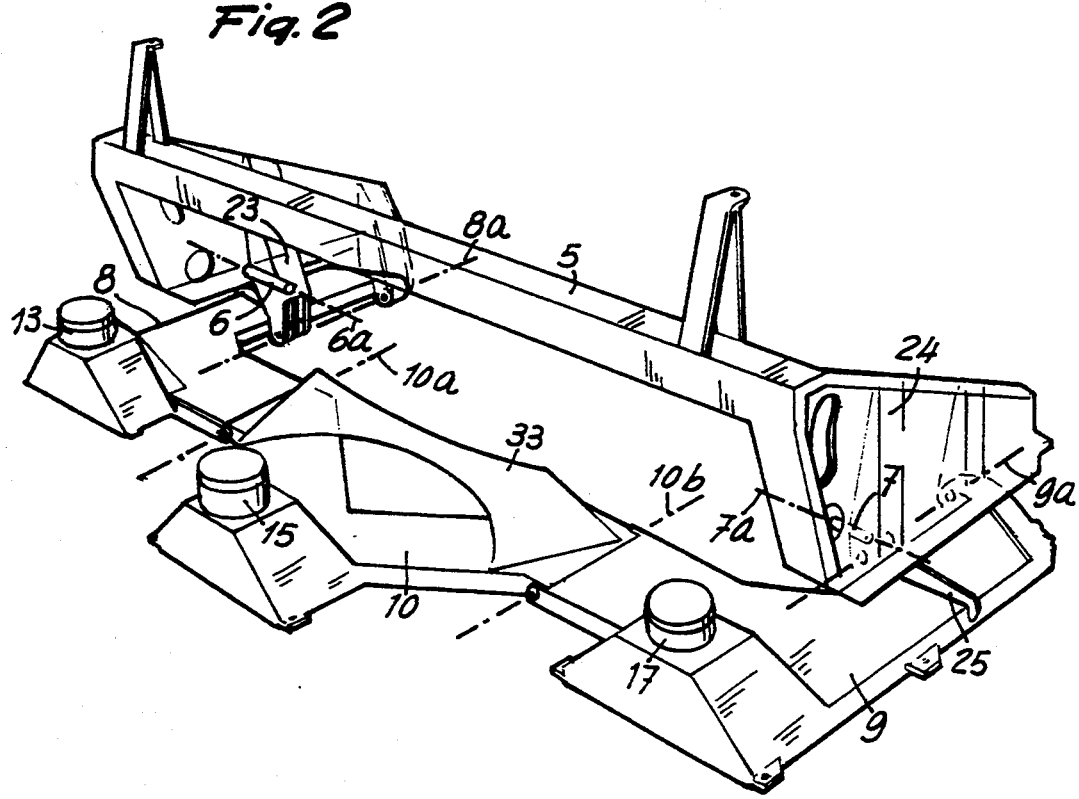

FORAGE MOWER

BACKGROUND OF THE INVENTION

The present invention relates to a forage mower.

The use of rotary mowers is widespread; these mowers comprise multiple disks, provided with blades, that are supported by a main frame and rotated at high speed; this rotary motion produces the cutting movement of the blades, and the forage is fed to the machine by moving said main frame, which supports the rotating disks, over the cultivated field.

These machines are furthermore often provided with a forage treatment device comprising two rollers, with or without meshing sets of teeth, which receive the cut forage in the region of mutual contact, bending or crushing the stalks and thus increasing the rate of moisture extraction from the stalks.

In known machines, the main frame, which during operation supports the rotating disks and drags on the ground, keeping the blades at a few centimeters from the ground to allow to cut the forage stalks close to their base, has a rigid structure, and it is evident that this configuration is disadvantageous: at every rise or hollow in the ground, or when a mole-hill is encountered, the blades make contact with the ground, and by pulverizing it, mix it with the forage, with consequent deterioration thereof; at .the same time, the entire mowing machine becomes clogged due to the entry of soil.

SUMMARY OF THE INVENTION

A principal aim of the present invention is thus to provide a forage mower that eliminates all possibilities of clogging of the cutting means and cuts forage without ever mixing it with soil.

Within the scope of the above aim, an object of the invention is to provide a mower wherein feeding of the cut forage to the treatment rollers is optimized.

Another object of the invention is to provide a mower that allows to easily change the pressure applied to the ground and to obtain optimum conditions for road travelling.

With this aim and these objects in view, there is provided, according to the present invention, a forage mower characterized in that it comprises at least one module connected to a supporting unit provided with a feeding motion by means of a pair of rockers that are pivoted on said unit and provided with means for movement on a plane which is parallel to the direction of the feeding motion, said module comprising a main frame, pivoted to the pair of rockers about an axis that is transverse to the feeding motion, to which the two end subframes of a chain of three mutually pivoted subframes are pivoted, each subframe supporting a disk provided with mowing blades and rotated by a hydraulic motor that is supported by the subframe, all the axes for the pivoting of said subframes to each other and of the end subframes to the main frame being parallel to the direction of the feeding motion.

BRIEF DESCRIPTION OF THE DRAWINGS

Further characteristics and advantages of the present invention will become apparent from the following detailed description of a preferred but not exclusive embodiment thereof, illustrated only by way of non-limitative example in the accompanying drawings, wherein:

FIG. 1 is a perspective view of the forage mower according to the invention in active position;

FIG. 2 is a perspective view of some mechanisms of the modules;

FIG. 3 is a front view of the means for moving one of the rockers in the condition suitable for road travel;

FIG. 4 is a detail view of the means for limiting the rotation of one of the end subframes;

FIG. 5 is a detail view of the tab that is fixed to a rocker to make contact with a bracket that is rigidly coupled to the main frame.

DESCRIPTION OF THE PREFERRED EMBODIMENTS

With reference to the above figures, the reference numeral 1 generally designates the module connected to the supporting unit 2 that is provided with the wheels 2a, 2b and is self-propelled, so as to impart to the mower the motion for feeding the forage to the cutting mechanisms described hereafter.

The module 1 and the supporting unit 2 are mutually connected by means of the two rockers 3 and 4, which are pivoted to the supporting unit along the axes 3a and 4a and are provided with means, described hereinafter, for moving in a plane parallel to the direction of the feeding motion, with a guiding action performed by the fixed elements 3b, 4b; for the time being it is sufficient to say that for this purpose, the axes 3a, 4a are arranged transversely to the direction of said motion.

The module 1 is now described in detail; it comprises the main frame 5, which is monolithically provided with the pivots 6 and 7 for pivoting to the rockers 3 and 4 respectively; said pivots have axes, respectively 6a and 7a, that are arranged transversely to the direction of the advancement motion of the mower.

The two end subframes 8 and 9 and the intermediate subframe 10 are mutually pivoted and form a chain; said end subframes 8 and 9 are pivoted to the main frame 5 about the axes 8a and 9a respectively: accordingly, the reference numeral 10a designates the axis for the pivoting of the subframe 10 about the subframe 8, and the reference numeral 10b designates the axis for the pivoting of said subframe 10 about the subframe 9.

Said four axes 8a, 9a, 10a, 10b are mutually parallel and have the same direction as the feeding motion of the mower.

Each of the subframes of the chain supports a hydraulic motor with supply pipes, such as 11, accommodated within the subframes; said motor rotates a disk that has mowing blades directly connected to it: thus, the reference numeral 12 designates the disk provided with mowing blades, such as 12a, and connected to the hydraulic motor 13 which is supported by the subframe 8; the reference numeral 14 designates the disk provided with blades, such as 14a, and connected to the hydraulic motor 15 which is supported by the intermediate subframe 10; and finally, the reference numeral 16 designates the disk provided with blades, such as 16a, and connected to the hydraulic motor 17 which is supported by the subframe 9.

The configuration of the subframes is completed by pads for dragging on the ground, designated by the reference numerals 18, 19 and 20, which are detachably fixed to the subframes 8, 10 and 9 respectively.

The pressure applied to the ground by the intermediate subframe 10 is adjusted by springs supported by the main frame 5 and acting on the end subframes 8 and 9 in the same manner; the spring 21, shown in FIGS. 1 and 5 and related to the end subframe 9, will be described in detail.

Said spring 21 is supported, with the registration device 21a interposed, by the main frame 5 and presses on the subframe 9 on the opposite side of the axis 10b, about which the subframe is pivoted to the intermediate subframe 10, with respect to the axis 9a, about which said subframe 9 is pivoted to the main frame 5; it is sufficient to adjust the pressure of the springs, such as 21, by acting on their registration devices, in order to transfer to the intermediate subframe 10, by means of the end subframes 8 and 9, the supporting forces that are most suited to produce the required pressure of said subframe on the ground.

As regards the three subframes, it should be noted that the two end subframes 8 and 9 have mechanical means for limiting their rotation about the axes 8a and 9a respectively; in describing these means with reference to the subframe 8, one observes the presence of the tab 22, which is rigidly coupled to said subframe and is inserted in the seat 23 that is rigidly coupled to the main frame 5; said tab 22 obviously produces said limitation of rotation by making contact with the walls of the seat.

An identical tab is present on the subframe 9 and is inserted in the seat 24 rigidly coupled to the main frame 5: its connecting rib 25 is illustrated.

The shape of the described module quite evidently allows the mower according to the invention to cut forage in optimum conditions, since the disks provided with the mowing blades can automatically follow the rises and hollows of the ground on which they rest.

More precisely, adaptation of their orientation so as to follow undulations that are longitudinal to the feeding direction, which is the same as the mower advancement direction, is allowed by the articulations between the rockers 3 and 4 and the supporting unit 2 and by the articulations between the main frame 5 and said rockers, provided by means of the pivots 6 and 7; all the axes 3a, 4a, 6a and 7a of said articulations are in fact orientated transversely to said feeding direction for this purpose.

Adaptation to follow undulations that are transverse to the feeding direction is instead entrusted to the articulations between the three subframes 8, 9 and 10 of the chain and to the articulations between the end subframes 8 and 9 and the main frame 5; the directions of the axes 8a, 9a, 10a, 10b of all these articulations in fact coincide with the direction of the feeding motion.

The mower according to the invention furthermore comprises the rollers 26 and 27 which are supported by the main frame 5 and treat the cut forage, by bending its stalks, to bring about quicker drying thereof.

These rollers can be, for example, motorized in a known manner by means of hydraulic motors such as 26a for the roller 26, and are associated with the main frame 5 in an equally known manner: the lower roller 27 has a fixed axis, whereas the upper roller 26 is supported by L-shaped elements such as 28, which is pivoted at 28a and is subjected to the action of the spring 29, and the required pressure is thus produced upon contact between the two rollers.

The mower according to the invention includes a whole series of provisions to direct the forage cut by the mowing blades, such as 12a, 14a, 16a in the most appropriate manner to the passage between the rollers 26 and 27 of the treatment unit; the first provision is constituted by the fact that the disks 12, 14 and 16 provided with the mowing blades have, in their central region, a protrusion, such as 12b for the disk 12, the height whereof does not exceed the level of the section for the entry of the forage between the rollers 26 and 27.

The consequent rising path of the forage is increased by the arc-like raised portions 30a and 30b that are rigidly coupled to the intermediate disk, whereas access of said forage to extreme regions of the rollers 26 and 27, with consequent poor operating effectiveness, is prevented by the elements 31 and 32 extending from the disks 12 and 16 in a position that faces said extreme regions; wings such as 31a and 32a extend from said elements 31 and 32 to help in conveying the cut forage toward the rollers 26 and 27.

The cradle-shaped housing 33, rigidly coupled to the intermediate subframe 10, is also provided for the same purpose.

The means allowing the rockers 3 and 4 to move about the pivots with axes 3a and 4a are now described in detail.

Said means comprise the actuation arms 34 and 35, which are pivoted at 34a, 35a to the supporting unit 2 about axes that are parallel to the axes 3a, 4a, and are connected to the actuation cylinders 34b, 35b respectively; said actuation arms and the rockers 3 and 4 are mutually connected by means of the pairs of springs 36 and 37 respectively, the ends of which have registration devices such as 36a for the pair of springs 36 and are fixed at intermediate points of said arms and rockers.

However, there is another mechanism for the possible connection between the actuation arms and the rockers, as clearly disclosed in the following description of operation; said mechanism is constituted by the rods 38 and 39 which are pivoted to the rockers 3 and 4 respectively, in a position that lies between the connecting points of the pairs of springs 36, 37 and the pivots for pivoting to the supporting unit 2; said rods comprise the slots 38a, 39a, which are associated with the pins 34c, 35c located at the ends of the actuation arms 34 and 35; the length of said slots is set so as to obtain the functional characteristics that will be described hereinafter, as mentioned.

The reference numerals 40 and 41 furthermore designate two springs that are connected, with an end registration device such as 40a for the spring 40, to the motor arms 34, 35 and to the main frame 5 respectively, with the purpose of balancing as required said main frame 5, the center of gravity of which is shifted forward with respect to the axes 6a, 7a, in its rotations about said axes 6a, 7a to follow the longitudinal undulations of the ground on which it rests.

Finally, the reference numerals 42 and 43 designate two tabs that are rigidly coupled respectively to the rockers 3 and 4 and are suitable to make contact, in a specific operating step described hereafter, respectively with the brackets 5a and 5b that are rigidly coupled to the main frame 5.

The functional conditions of the described means for moving the rockers 3 and 4 are as follows.

When said rockers are in the fully lowered position illustrated in FIG. 1, which is a normal operating condition, the module 1 presses on the ground, resting on it by means of the dragging pads 18, 19 and 20, with a pressure determined by its weight, which is reduced by the tension of the pairs of springs 36, 37, which is appropriately adjusted by means of their registration devices.

If in certain occasional conditions, assessed in each instance by the operator, the pressure applied by the module to the ground must be reduced, it is sufficient to raise the actuation arms 34, 35 by actuating the actuator cylinders 34b, 35b to increase the tension of the pair of springs 36 and 37, consequently reducing the pressure on the ground.

The lifting of the actuation arms 34 and 35 can continue up to the extreme condition in which the pins 34c, 35c inserted in the slots 38a, 39a almost touch the upper end of said slots, with a progressive increase in the tension of the pair of springs 36 and 37 and a consequent progressive reduction in the pressure of the module on the ground until said pressure is almost zero when said extreme condition is reached.

Throughout these steps, the tabs 42 and 43 rigidly coupled to the rockers 3 and 4 are spaced from the brackets 5a, 5b that are rigidly coupled to the main frame 5, which can therefore oscillate about the pivots 6 and 7 to follow the longitudinal undulations of the ground; this is the condition shown in FIG. 5.

However, it should be noted that the elastic link formed between the actuation arms 34 and 35 and the rockers 3 and 4 in all of the above-described steps, which is perfectly functional during the operation of the machine, is not compatible with road travel due to the oscillations that it would produce, making it difficult to drive.

It is thus necessary to make said link between the actuation arms and the rockers rigid and furthermore prevent the main frame 5 from being able to rotate about the pivots 5 and 6 about which it is pivoted to said rockers; to accomplish this, it is sufficient to raise the actuation arms beyond the extreme condition described earlier.

At this point, it is the connection of the pins 34c, 35c to the upper end of the slots 38a, 39a that raises the rockers 3 and 4 so that they follow the actuation arms 34 and 35, progressively eliminating the action of the pairs of springs 36 and 37 until it becomes zero in the maximum elevation condition of the actuation arms, which is shown in FIG. 3.

Before reaching this condition, contact between the tabs 42 and 43 and the brackets 5a, 5b had occurred, as shown in said FIG. 3, thus allowing the springs 40 and 41, too, to lose tension.

When the link between the actuation arms and the rockers is completely rigid, the main frame 5 can no longer rotate, and optimum conditions for road travel of the machine are thus provided.

From what has been described it is thus evident that the present invention is capable of offering optimum functional conditions: by virtue of the ability to follow transverse and longitudinal undulations of the ground while resting on it, any possibility of clogging of the cutting means is eliminated, and the forage can furthermore be cut without being mixed with soil; the forage is also optimally fed to the treatment rollers.

The described invention is susceptible to numerous modifications and variations, all of which are within the scope of the inventive concept: thus, for example, the rockers 3 and 4 can be motorized in any manner, and the means for producing the rigid mutual linkage of said rockers and said actuation arms, if present, can be provided in any manner; said means may also be omitted if it is not deemed necessary to give the machine an optimum configuration for road travel.

It should also be noted that the supporting unit 2, instead of being self-propelled, may have means for towing it with a tractor, or can be shaped so that it can be connected to the lifting unit of a tractor.

Finally, it should be noted that the described module 1 may be provided with means for coupling to similar modules to be arranged contiguously to increase the operating width of the machine and therefore its productivity.

I claim:

1. Forage mower comprising at least one module connected to a supporting unit provided with a feeding motion by means of a pair of rockers that are pivoted on said unit and are provided with means for movement on a plane which is parallel to the direction of the feeding motion, said module comprising a main frame, pivoted to the pair of rockers about an axis transverse to the feeding motion, to which two end subframes of a chain of three mutually pivoted subframes are pivoted, each subframe supporting a disk that has mowing blades and is rotated by a hydraulic motor supported by the subframe, all the axes for the pivoting of said subframes to each other and of the end subframes to the main frame being parallel to the direction of the feeding motion.

2. Mower according to claim 1, further comprising a spring for each end subframe, said spring being supported, with a registration device, by the main frame and pressing on the end subframe on the opposite side of the axis about which said end subframe is pivoted to the intermediate subframe with respect to the axis about which said end subframe is pivoted to the main frame.

3. Mower according to claim 1, wherein each end subframe has mechanical means for limiting its rotation.

4. Mower according to claim 3, wherein each end subframe has a tab suitable to form an element for limiting its rotation by making contact with the walls of a seat that is rigidly coupled to the main frame.

5. Mower according to claim 1, further comprising pads for dragging on the ground that are detachably connected to each of the three subframes.

6. Mower according to claim 1, wherein the main frame pivoted to the pair of rockers supports two motorized rollers that are suitable to treat the forage by bending.

7. Mower according to claim 6, wherein the disks provided with mowing blades have, in their central region, a substantially conical protrusion extending upwardly up to a level that is lower than the level at which the forage enters between the rollers for treating it.

8. Mower according to claim 6, further comprising elements that extend upwardly from the blade-equipped disks supported by the end subframes, said elements facing the ends of the rollers suitable to treat the forage and being provided with wings for conveying the cut forage to said rollers.

9. Mower according to claim 8, wherein the blade-equipped disk supported by the intermediate subframe is provided with arc-like raised portions the concavity of which is directed forward along the direction of rotation, said raised portions being suitable to guide the cut forage toward the inlet of the treatment rollers.

10. Mower according to claim 1, further comprising, in the rear region of the intermediate subframe, a cradle-shaped housing that facilitates the entry of the cut forage between the rollers suitable to treat it.

11. Mower according to claim 1, wherein the means for moving the rockers hinged to the supporting unit comprise, for each rocker:

an actuation arm that is pivoted to said supporting unit, about an axis parallel to the pivoting axis of the rocker and in a position overlying it, and is connected to an actuation cylinder;

at least one spring which is connected at its ends, by means of a registration device, to said actuation arm and to said rocker respectively;

at least one spring which is connected at its ends, by means of a registration device, respectively to said actuation arm and to the main frame that is pivoted to the rockers in a position overlying the axis of said pivoting;

means suitable to produce a rigid linkage between the actuation arm and the rocker, eliminating the action of said springs, when the actuation arm reaches an angle of rotation that substantially corresponds to a condition of maximum reduction of the pressure applied by the main frame to the ground.

12. Mower according to claim 1, wherein said means for moving the rockers pivoted to the supporting unit comprise, for each rocker:

an actuation arm that is pivoted to said supporting unit, about an axis parallel to the pivoting axis of the rocker and in a position overlying it, and is connected to an actuation cylinder;

at least one spring which is connected at its ends, by means of a registration device, to said actuation arm and to said rocker respectively;

at least one spring which is connected at its ends, by means of a registration device, respectively to said actuation arm and to the main frame that is pivoted to the rockers in a position overlying the axis of said pivoting;

a rod that is connected by pivoting to the rocker in a position comprised between the coupling of one end of the at least one spring, which is connected to the actuation arm at its other end, and the pivot for pivoting said rocker to the supporting unit, said rod being provided with a slot that is associated with a pin, which is provided at the end of the actuation arm, and has such a length that contact between the pin associated therewith and its upper end occurs at an angle of rotation of the actuation arm that substantially corresponds to a condition in which the pressure of the main frame on the ground undergoes maximum reduction;

a tab connected to the rocker and suitable to make contact with the upper face of a bracket that is connected to the main frame in a position that lies to the rear of the axis for the pivoting of said main frame to said rocker, said tab having such a length that said contact occurs in a position of the actuation arm that is proximate to the one producing contact between the pin associated with the slot and the upper end of said slot.

13. Mower according to claim 1, wherein the means for moving the rockers pivoted to the supporting unit comprise, for each rocker, an actuation arm that is pivoted to said supporting unit, about an axis parallel to the pivoting axis of said rocker and in a position overlying it, and is connected to an actuation cylinder, and at least one spring which is connected at its ends, by means of a registration device, respectively to said actuation arm and to said rocker.

14. Mower according to claim 1, wherein the supporting unit provided with feeding motion is self-propelled.

15. Mower according to claim 1, wherein the supporting unit provided with feeding motion is equipped with means for being towed with a tractor.

16. Mower according to claim 1, wherein the supporting unit provided with feeding motion is provided with means for coupling to the lifting device of a tractor.

17. Mower according to claim 1, wherein said at least one module is provided with means for coupling to contiguous modules.

* * * * *